United States Patent [19]
Cheng et al.

[11] Patent Number: 6,006,192
[45] Date of Patent: Dec. 21, 1999

[54] METHOD FOR PRODUCTION PLANNING IN AN UNCERTAIN DEMAND ENVIRONMENT

[75] Inventors: Feng Cheng, Elmsford; Daniel Patrick Connors, Wappingers Falls; Thomas Robert Ervolina, Hopewell Junction, all of N.Y.; Ramesh Srinivasan, San Jose, Calif.

[73] Assignee: International Business Machines Corporation, Armonk, N.Y.

[21] Appl. No.: 08/815,825

[22] Filed: Mar. 12, 1997

[51] Int. Cl.[6] .............................. G06F 15/00; G06F 15/46; G06F 15/21; G06F 15/22

[52] U.S. Cl. .................................. 705/7; 705/10; 705/20; 705/28; 705/29; 705/35; 705/8

[58] Field of Search ..................... 395/208, 701, 395/703, 898; 364/468, 401, 403, 468.13, 468.19, 468.01, 149; 705/10, 28, 8, 38, 35, 7, 20, 29; 702/2; 342/64

[56] References Cited

U.S. PATENT DOCUMENTS

| | | | |
|---|---|---|---|
| 4,847,761 | 7/1989 | Ferriter et al. | 364/401 |
| 4,862,376 | 8/1989 | Ferriter et al. | 364/468 |
| 5,229,948 | 7/1993 | Wei et al. | 364/468 |
| 5,237,495 | 8/1993 | Morii | 364/401 |
| 5,287,267 | 2/1994 | Jayaraman et al. | 364/403 |
| 5,615,109 | 3/1997 | Eder | 395/208 |

OTHER PUBLICATIONS

Kapsiotis G. and Tzafestas S., Hierarchical Control Approach to Managerial Problems for Manufacturing Systems, in Modern Manufacturing, Information Control and Technology, , ed. Zaremba & Prasad, Springer–Verlag, pp. 173–223, 1994.

Beckert B.A., The role of Computer–Integrated Manufacturing, in The CAD/CAM Handbook, ed. Machover C., McGraw–Hill, pp. 229–238, 1996.

*Primary Examiner*—Allen R. MacDonald
*Assistant Examiner*—Pedro R. Kanof
*Attorney, Agent, or Firm*—Scully, Scott, Murphy & Presser; Stephen C. Kaufman, Esq

[57] ABSTRACT

A decision-making method suitable for production planning in an uncertain demand environment. To this end, the method comprises combining an implosion technology with a scenario-based analysis, thus manifesting, a sui generis capability which preserves the advantages and benefits of each of its subsumed aspects.

12 Claims, 7 Drawing Sheets

A canonical scenario tree.

A canonical scenario tree.

A general scenario tree.

METHOD FOR PRODUCTION PLANNING IN AN UNCERTAIN DEMAND ENVIRONMENT

FIELD OF THE INVENTION

This invention relates to a decision-making method suitable for production planning in an uncertain demand environment.

INTRODUCTION TO THE INVENTION

One of the important issues in production planning is to deal with uncertainties associated with demand. While a vast volume of the literature addresses this issue, production/materials planning under uncertainty still presents a significant challenge to researchers and practitioners.

There have been many interesting studies in inventory/production planning theory. However, we have discerned that the results obtained so far are either based on oversimplified assumptions, or are computationally intractable for real-world problems.

For example, the well-known EOQ (Economic Order Quantity) model invented in the early part of this century is considered to be one of the earliest and most important developments in the mathematical inventory/production planning theory. The basic EOQ model still remains the most widely used analytical method for inventory control in practice. In the 50's and 60's, more serious mathematical analyses of various inventory problems were undertaken and became the fundamentals of later developments in the area.

The solutions available in the literature can be categorized into two general types. One type of solution can be considered to be the extensions of the EOQ model where a simple form solution can be obtained under certain assumptions about demand, costs, and other parameters. Especially, the studies on single product and single location problems have produced a rich collection of analytical models, including many variations of the EOQ model and (s,S) models. This type of solution is usually easy to implement and interpret because of its simplicity. However, the assumptions made to ensure the validity of the solution are often restrictive and may not be consistent with the reality. Another general type of solution normally involves a mathematical programming formulation, which allows more flexible modeling of the underlying production/inventory process, and, therefore, can handle a wide range of real-world applications. A major limitation to the use of math programming solutions is often the large size of real-world problems, even though the advances over the years of computer hardware and software have greatly enhanced our ability to solve large scale math programming problems.

In the last two decades, material requirements planning (MRP) has become a common practice in industry for the purposes of production planning and control. The earlier versions of MRP largely focused on managing materials. The same concepts were applied to labor, another important factor in planning. Beyond labor and material, further applications dealt with equipment, tooling and other resources. These variations gave rise to the broader term, manufacturing resource planning, which is often referred to as MRP II.

As a particular example, we note the implosion(TM) technology developed in IBM which is able to provide feasible and optimal production plans under materials and capacity constraints. Traditional MRP systems perform requirements analysis by using demands and the Bill Of Materials (BOM) to determine the necessary resources to fulfill the demand. In contrast, implosion(TM)-based systems can perform resource allocation under constraints by using demands, available resources, and the Bill Of Manufacture (includes BOM as well as Bill of Capacities) to determine a feasible product mix which meets the user goals. These goals correspond to user defined criteria such as customer serviceability, profit maximization, inventory minimization, and revenue maximization.

However, the effectiveness of MRP-based systems may be limited by the weaknesses of the basic MRP framework. Particularly, uncertainty is ignored in the standard MRP approach. All parameters, such as the future demand, production rates, yields, lead times, etc., are treated as if they were known with certainty.

One useful technique often used to deal with the uncertainty is the scenario-based analysis. Scenarios are usually used as a simplified way of representing the uncertainty. By performing multiple optimization runs against different scenarios, one can gain the insights needed to plan effectively for an uncertain future. Escudero and Kamesam (1992) provide a scenario-based solution methodology for solving aggregate production planning problems under demand uncertainty. They obtain an implementable policy by solving a stochastic LP problem. (See Escudero, L. and P. Kamersom, MRP Modeling via Scenarios, Research Report, RC-17982.)

SUMMARY OF THE INVENTION

We have now discovered a "Payoff Table" approach that is designed as a decision-making methodology for production planning in an uncertain demand environment. The methodology comprises combining the power of the scenario-based analysis and the implosion technology. For each individual demand scenario, the implosion method may be used to provide a deterministic solution which is optimal given the particular demand scenario. Furthermore, we also compute the performance measure of each solution against all other potential demand scenarios. The complete enumeration of performance measures for each solution against all demand scenarios produces a payoff table, which may be referred to as a production plan payoff table (PPPT).

Accordingly, we disclose a novel program storage device readable by a machine, tangibly embodying a program of instructions executable by the machine to perform method steps for production planning in an uncertain demand environment, said method steps comprising:

1) representing the uncertainty in the demand environment by employing a scenario-based analysis including the steps of performing multiple optimization runs against different demand scenarios; and 2) combining an implosion technology with the scenario-based analysis for generating for any one individual demand scenario, a deterministic solution which is optimal for the particular demand scenario.

The novel method as defined can realize important advantages, as enumerated below. Here, it is significant to note that the method, by way of its agency of combining implosion technology with a scenario-based analysis, can perserve the benefits of each disparate aspect, while manifesting in combination a sui generis capability of qualitative advantage and utility over the prior art.

BRIEF DESCRIPTION OF THE DRAWING

The invention is illustrated in the accompanying drawing, in which.

DETAILED DESCRIPTION OF THE INVENTION

Figure 1:
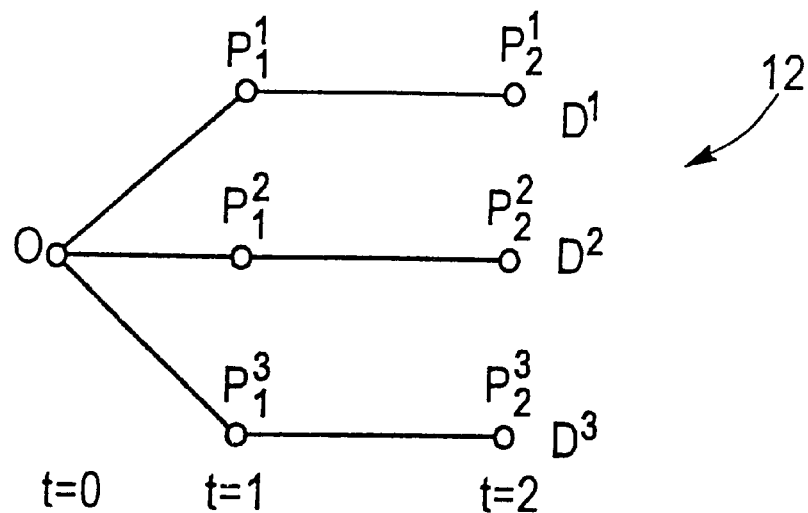
FIG. 1 shows a canonical scenario tree.

The detailed description of the invention is organized as follows. In Section 1, we introduce the notation and present a deterministic version of materials planning problems. The concept of Payoff Table is discussed in Section 2. Illustrative algorithms are provided in Section 3. We describe the graphical user interface developed for Payoff Table in Section 4. Finally, a complete example is presented in Section 5.

1. Formulation of the Materials Planning Problem

To formulate the problem defined in the PPPT computation, we introduce the following notation for a deterministic materials planning problem.

T, set of periods that comprise the planning horizon.
J, set of products.
$J_e \subseteq J$, set of end products.
$J_a \subseteq J$, set of subassemblies.
I, set of components.
$I_r \subseteq I$, set of out-sourcing components. (Note, $I_r \cap J_a$= empty and $I=I_r \cup J_a$.)
$I_j \subseteq I$, set of components in the BOM of product $j \in J$.
$d_{j,t}$, demand for end product $j \in J_e$ in period t.
$c_j$, cycle time of product $j \in J$.
$O_{ij}$ offset for component i in the cycle time of product j for $i \in I_j$ and $j \in J$.
$a_{ij}$ amount of component i that is needed by one unit of product j for $i \in I_j$ j and $j \in J$.
$h_{i,j}$, unit holding cost for component $i \in I$ in period t.
$h^c_{j,t}$, unit holding cost for end product $j \in J_c$ in period t.
$r_{j,t}$, unit penalty for unsatisfied demand of end product $j \in J_e$ in period t.

Variables:
$C_{j,t}$, ending inventory of product $j \in J_e$ in period t.
$Z_{j,t}$, production volume of end product $j \in J_e$ in period t.
$L_{j,t}$, unsatisfied demand of end product $j \in J_e$ in period t.
$Q_{i,t}$, ending inventory of component $i \in I$ in period t.
$Y_{i,t}$, consumed volume of component $i \in I$ in period t.
$X_{i,t}$, production/procurement volume of component $i \in I$ in period t.

Note
$C_{j,0}$, initial inventory of product $j \in J_e$ at the beginning of the planning horizon.
$Q_{i,0}$, initial inventory of component $i \in I$ at the beginning of the planning horizon.

Production and procurement decisions are made at the beginning of each period based on the information available at that time. Demands materialize by the end of each period. Unsatisfied demand will be backlogged, and inventories will be carried over to the next period. At the end of the planning horizon, all left over inventories of components and end products will be savaged.

1.1. Deterministic

A Linear Program can be formulated as follows.

$$\min \sum_{j \in J_e, t \in T} h^c_{j,t} C_{j,t} + \sum_{i \in I, t \in T} h_{i,t} Q_{i,t} + \sum_{j \in J_e, t \in T} r_{j,t} L_{j,t}$$

subject to $$C_{j,t-1}+Z_{j,t}+L_{j,t}=d_{j,t}+C_{j,t}, t \in T, j \in J_e$$

$$Q_{i,t-1}+X_{i,t}-Y_{i,t}=Q_{i,t}, t \in T, i \in I$$

$$\sum_{j \in J, i \in I_j} a_{ij} W_{i,\tau} = Y_{i,t-1}, t \in T, i \in I$$

where $\tau = t + O_{ij}$ $$C_{j,t}, Q_{i,t}, Z_{j,t}, X_{i,t}, Y_{i,t} \geq 0, 0 \leq L_{j,t} \leq d_{j,t} \ t \in T, j \in J_e, i \in I$$

where $$W_{j,\tau} = \begin{cases} Z_{j,\tau}, & j \in J_e \\ X_{j,\tau}, & j \in J_a \end{cases}$$

The LP formulation presented above is a simplified version of a typical materials planning problem with deterministic demands. In this formulation, all the decisions are made at the beginning of the planning horizon. The solution of this problem can be obtained using an implosion technology-based optimization engine, such as Supply Capability Engine (SCE). For the sake of simplicity, many advanced features that can be handled by implosion technology are omitted in this formulation.

Notice that the production cost and the procurement cost are not included in this formulation. However, it is easy to show that when these costs are linear and time-invariant, they do not affect the solution of the optimization problem. Furthermore, the cost minimization formulation presented here is equivalent to a profit maximization formulation since the demand, hence the revenue from sales, is independent of the production decision. Even in the case of lost sales, the situation can be handled by including the loss in sales as a penalty cost of the unsatisfied demand.

The formulation presented here describes a single-scenario problem. When the demand uncertainty is modeled via scenarios, the above formulation can still be used to obtain a solution for each scenario individually. However, the single-scenario solution may perform badly when a different scenario actually occurs.

1.2. Scenario-based analysis

Let
S=set of scenarios.
N=number of the scenarios.
$D^s$=demand under scenario $s \in S$. $D^s$ can be expressed by the matrix $$D^s = \begin{bmatrix} d_{11} & d_{12} & \ldots & d_{1n} \\ d_{21} & d_{22} & \ldots & d_{2n} \\ \vdots & \vdots & \ldots & \vdots \\ d_{m1} & d_{m2} & \ldots & d_{mn} \end{bmatrix}$$

where n is the number of periods in the planning horizon, m is the number of the products. To simplify the notation, we suppress the superscript for each element in the matrix.

$P^s$=production decision under scenario $s \in S$. It is referred to as the Scenario solution for scenario s.

Note that a scenario solution consists of both a production schedule for all products and a procurement schedule for all components in each period of the entire planning horizon. It can be expressed by the following matrix $$P^s = \begin{bmatrix} Z_{11} & Z_{12} & \ldots & Z_{1n} \\ \vdots & \vdots & \ldots & \vdots \\ Z_{m1} & Z_{m2} & \ldots & Z_{mn} \\ X_{11} & X_{12} & \ldots & X_{1n} \\ \vdots & \vdots & \ldots & \vdots \\ X_{l1} & X_{l2} & \ldots & X_{ln} \end{bmatrix}$$

where l is the number of components.

To deal with the demand uncertainty over a period of time, recourse actions may be taken so that unimplemented decisions can be modified according to new information when it becomes available. For example, at t=1, $Z_{11}$ is implemented; $Z_{12}, \ldots, Z_{1n}$ are computed but not implemented. There are different types of recourse actions that can be taken. We will discuss two possibilities: the simple recourse and the full recourse.

In the simple recourse, production decisions cannot be changed (even as new information becomes available). In this case, the LP formulation is similar to that of the single-scenario case. Nevertheless, the objective function will be the weighted-average of the objective functions for individual scenarios, and all the constraints have to be duplicated for each scenario.

The full recourse allows all the production and procurement decisions to be revisited every time period and adjustments can be made based on the latest information. With full recourse, additional constraints reflecting the nonanticipativity assumption of a production decision must be added in the model. The definition of the nonanticipativity is given in the next section.

To obtain an optimal solution of a multi-scenario problem usually requires solving a stochastic LP program. Especially in the full recourse case it is far more complex than that for the single-scenario model. Therefore, a heuristic-based solution like the payoff table approach becomes necessary.

The payoff table approach is also a useful tool for sensitivity analysis. We can use the payoff table to find out the expected performance of a particular production plan under different demand scenarios.

2. The concept of PPPT

The PPPT is a tool for production planning decision-making based on scenario analysis and the IBM implosion technology.

The PPPT computation is based on the following key concepts.

Scenarios are used to represent possible realizations of uncertain demand.

For each demand scenario, a deterministic solution approach (such as the IBM implosion technology) can be used to produce a scenario-dependent production plan. It is clear that a production plan based on a particular demand scenario is optimal only if the actual demand scenario turns out to be the same scenario used for the planning.

In reality a different demand scenario may actually occur, and therefore, the production plan may not be optimal for the actual demand scenario. To minimize the unfavorable impact of the mismatch between the production plan and the actual demand scenario, we would like to evaluate the expected overall performance measure and the robustness of a production plan against all different demand scenarios.

Furthermore, when a production plan is evaluated against a different demand scenario, we need to keep in mind that the production plan will be re-optimized when new information about demand becomes available, and only the initial portion of the production plan has to be fixed and implemented.

Based on the evaluation for each scenario-dependent production plan, we will be able to choose one based on the expected performance or the robustness of the production plan against all possible demand scenarios.

2.1. Scenario Representation for Demand

The tree structure is utilized internally to represent demand scenarios. A general scenario tree can be illustrated by FIG. 1 (numeral 12).

Each node except the root represents the demands for all products in a given period. A complete path from the root to an end node forms a demand scenario. Different demand scenarios may have the same demands initially and then diverge from a certain point. A special type of scenario tree is the ones with the canonical structure. In a canonical tree, the root is the only common node for any two branches. A canonical demand scenario tree means that all demand scenarios diverge from the first period in the planning horizon.

The scenario table is provided by users as an input. It specifies the demand scenarios over the planning horizon. Suppose there are N demand scenarios and the number of periods in the planning horizon is n. A scenario table is an N×(n+1) matrix. Each row of the scenario table describes a demand scenario with the first n elements representing the demands in the n periods and the last element being the probability of that the scenario will occur. A demand for a given scenario in a given period is labeled by an integer. Usually, the first n elements of Scenario 1 are assigned to be 1's. For Scenario 2, if the demand in a given period is different from the that in the same period for Scenario 1, then the number 2 will be used to represent the demand for Scenario 1; if the demand is the same with that in the same period for Scenario 1, the number will remain the same. The same procedure applies for the rest of the scenarios as well. Notice that demands in different periods can also be represented by the same integer number. But the actual demands can be different in different periods. In fact, the actual demand quantities will be provided as a separate input by users.

In the following example, we have a problem with 3 different scenarios. The planning horizon is 2 periods. The scenario table is given below:

1 1 0.5
1 2 0.3
2 3 0.2

Figure 2:
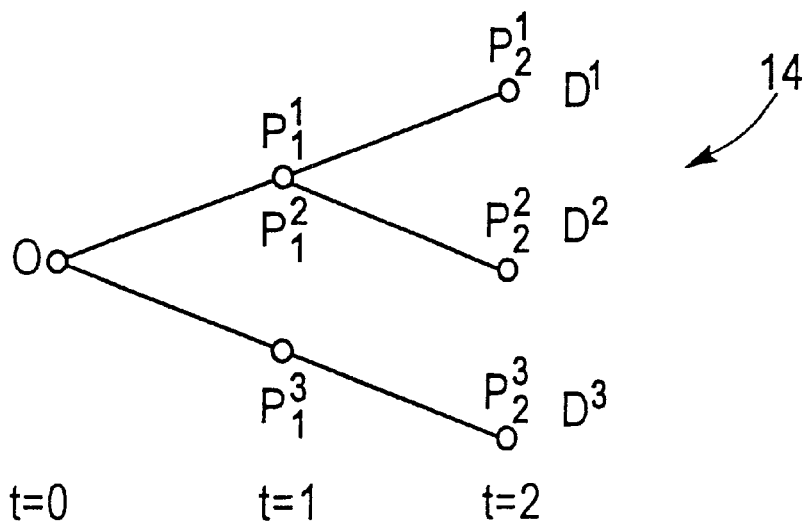
FIG. 2 shows a general scenario tree.

The corresponding scenario tree is shown in FIG. 2 (numeral 14).

2.2. The structure of PPPT

In the PPPT computation, the scenario-based representation for demand is used. A demand scenario is a multi-period statement of demand for a group of products. A set of demand scenarios and the probabilities associated with each scenarios are provided as inputs to represent the uncertain demand.

For each of the demand scenarios, the PPPT first computes the optimal production plan under a certain performance criterion. For a given demand scenario, the optimal production plan specifies the production quantities for each product in each period with the best overall performance measure under materials and capacity constraints. Then the performance measures of the optimal production plan for the given demand scenario are computed against all other demand scenarios. A complete payoff table is constructed by repeating this process for all the demand scenarios. The structure of a payoff table is illustrated in Table 1.

TABLE 1

The structure of the Payoff Table

| | scenario | | | | | | |
|---|---|---|---|---|---|---|---|
| initial plan | $D^1$ | $D^2$ | ... | $D^N$ | E | $\Delta^+$ | $\Delta^-$ |
| $P^1$ | $R_{1,1}$ | $R_{1,2}$ | ... | $R_{1,N}$ | $E_1$ | $\Delta_1^+$ | $\Delta_1^-$ |
| $P^2$ | | | | | | | |
| . | | | | | | | |
| . | | | | | | | |
| . | | | | | | | |
| $P^N$ | $R_{N,1}$ | $R_{N,2}$ | ... | $R_{N,N}$ | $E_N$ | $\Delta_N^+$ | $\Delta_N^-$ |

The interpretation of the elements in the table is given below.

$R_{i,i}$—the optimal payoff for scenario i;

$R_{ij}$—the payoff for scenario j ($j \neq i$) when production plan $P^i$ ($i \in S$) is used for the first period, and then the production plan is subsequently re-optimized.

$E_i$—the expected payoff of production plan i at the beginning of the planning horizon, i.e., $$E_i = \sum_{j \in S} p_j R_{ij},$$

$\Delta_j^+$—the difference between the maximum payoff and the expected payoff, and $\Delta_i^-$—the difference between the minimum payoff and the expected payoff.

3. The computation of PPPT

In general, an optimization problem can be formulated to obtain a production plan under a certain criterion. Let the objective function be f(P|D,w) where P is the decision variable (the production plan), D is the demand which is a random variable, and w represents all other parameters that affect the objective function (e.g., costs, supply constraints, etc.). For the simple recourse case, the optimization problem is given by $$\max_P E_D f(P \mid D, w). \qquad (1)$$

The solution to (1) can be obtained by either an optimization solver or a heuristic-based approach.

The PPPT is a heuristic approach for solving Problem (1) in a multi-scenario setting. In the payoff table computation, each element of the payoff table presents the performance measure corresponding to a production plan in a particular demand scenario.

3.1. Diagonal elements

For the computation of diagonal element $R_{i,i}$, i=1, ..., N, we have $D=D^i$. The solution can be obtained by solving the following problem.

$$\max_P f(P \mid D^i, w). \qquad (2)$$

The solution to (2) is called Scenario solution i, which is denoted by $P^i$.

3.2. Off-diagonal elements

For the off-diagonal elements, the problem becomes a constrained optimization problem. In the case of the canonical demand scenario tree, the general formulation for the computation of off-diagonal element $R_{ij}$, $i \neq j$, can be presented as follows.

$$\max_P f(P \mid D^j, w). \qquad (3)$$

where $P_1$ is the first column of P, and $P_1^i$ is the first column of $P^i$. In this case, the assumption made for computing the off-diagonal elements of the payoff table is that the initial production plan is made based on demand scenario i but the actual demand scenario turns out to be j. The decision maker can adjust the production plan at the beginning of the second period. However, the production plan made according to scenario i is already implemented for the first period. Therefore, the decision variables of the first period have to be fixed in the re-optimization which is based on the new scenario j.

3.2.1. Nonanticipativity

One important concept in the implementation of PPPT computation is the nonanticipativity of the production plan. The nonanticipativity assumption guarantees that the decisions made in any given period are implementable, i.e., they do not depend on information that is not yet available. If a plan is nonanticipative, the decisions made in a period are identical for any two scenarios that are identical up to that period. This means that if a node is common to two different demand scenarios, the decisions must be the same at the common node for the two production plans made based on the two demand scenarios. The computation of off-diagonal elements should respect the nonanticipative assumption in order to make the production plan implementable. One such example is illustrated in FIG. 2 (numeral 14), where the nonanticipavity requires that $P^1_1 = P^2_1$. In the case of canonical scenario trees, the nonanticipativity is implied in the formulation shown in (3) since the only common node is the root and the re-optimization always takes place in the second period.

In general, the requirements for the nonanticipative assumption can be written as follows.

$$P_t^i = P_t^j, t=1, \ldots, \tau, \forall i,j \text{ that are identical up to } \tau. \qquad (4)$$

However, the computation of off-diagonal elements when the scenario tree is non-canonical form is not as straightforward as for canonical scenario trees. The difficulty is that for every common node, the nonanticipativity requires the decisions at the node to be the same for all demand scenarios sharing the node. The solution respecting such a property, i.e., condition (4), and at the same time without compromising the optimality would require the use of stochastic LP technique, which could be computationally complex. To overcome this difficulty, a heuristic is adapted in the PPPT computation for the scenario tree with non-canonical form.

3.2.2. The Algorithm for Computing $R_{ij}$

Without loss of generality, we assume $p_1 \geq p_2 \geq \ldots \geq p_N$, where $p_j$ is the probability of scenario j.

Diagonal elements $R_{i,i}$ is computed the same way as in (2).

For off-diagonal element $R_{ij}$, $i \neq j$, if a node of scenario j is common to scenario i in period n, let $$P_n = P_n^i. \qquad (5)$$

If a node of scenario j is common to any scenarios other than i, let i' be the smallest index of all these scenarios. If i'<j, let $$P_n = P_n^{i}. \quad (6)$$

Off-diagonal element $R_{ij}$ is then obtained by solving (2) with constraints (5) and (6).

3.3. Upper and Lower Bounds

PPPT also provides the upper and lower bounds of the optimal solution for the stochastic programming problem with full recourse. The upper and lower bounds are given by $$R_U = \sum_{i \in S} \rho_i R_{ii}, \text{ and } R_L = \max\{E_i\},$$

respectively.

Proof.

Denote the optimal solution by P*. The expected payoff of P* is given by $$R^* = \sum_{i \in S} \rho_i R(P^* \mid D^i),$$

where $R(P^*|D^i)$ is the payoff of P* under scenario i.

Since $R_{ii} \geq R(P^*|D^i)$, $$R_U = \sum_{i \in S} \rho_i R_{ii} \geq \sum_{i \in S} \rho_i R(P^* \mid D^i) = R^*.$$

On the other hand, since P* is optimal, its expected payoff is at least as good as the expected payoff of any scenario solution, i.e., $R^* \geq E_i$, for all i.

3.4. Optimization Engine

In the PPPT implementation, we preferably use SCE as the optimization engine. SCE is a production planning optimization software developed at IBM Research for computing the capability to supply finished goods based on availability of constrained components. SCE is based on the implosion technology. It can perform resource allocation under constraints by using demands, available resources, and the Bill Of Manufacture (includes BOM as well as Bill of Capacities) to determine a feasible product mix which meets the user defined criterion. The type of the objective function used by SCE can be one of the three options: Revenue, Profit, or Priority. Among them, Priority is not used in the PPPT computation. Furthermore, since SCE does not include cost information for inventory holding, backlog penalty, and obsolescence, the profit obtained by SCE will be adjusted to reflect these costs. However, these costs are computed after the SCE optimization is completed.

The diagonal elements of the PPPT are obtained by running SCE for the given reference scenarios. The off-diagonal elements are computed by running SCE with the demand given by the new scenario and the production constraints imposed by the production plan made based on the reference scenario and the nonanticipative assumption. For example, for an off-diagonal element which represents the performance measure under scenario j for the production plan made initially based on scenario i, we first obtain the production constraints (5) and (6), then run SCE against the demand scenario j.

4. The Graphical User Interface

The graphical user interface is built in forms of World Wide Web (WWW) pages. The programs implementing the PPPT computation are installed on a server which is also the Web server hosting the WWW pages for the graphical user interface of PPPT. All the required data are stored on the same server. A user accesses the graphical user interface of PPPT by linking a Web browser to the Universal Resource Locator (URL) of the server. A Logon page will be presented when the connection is established (See FIGS. 3–8, numerals 16–26).

Figure 3:
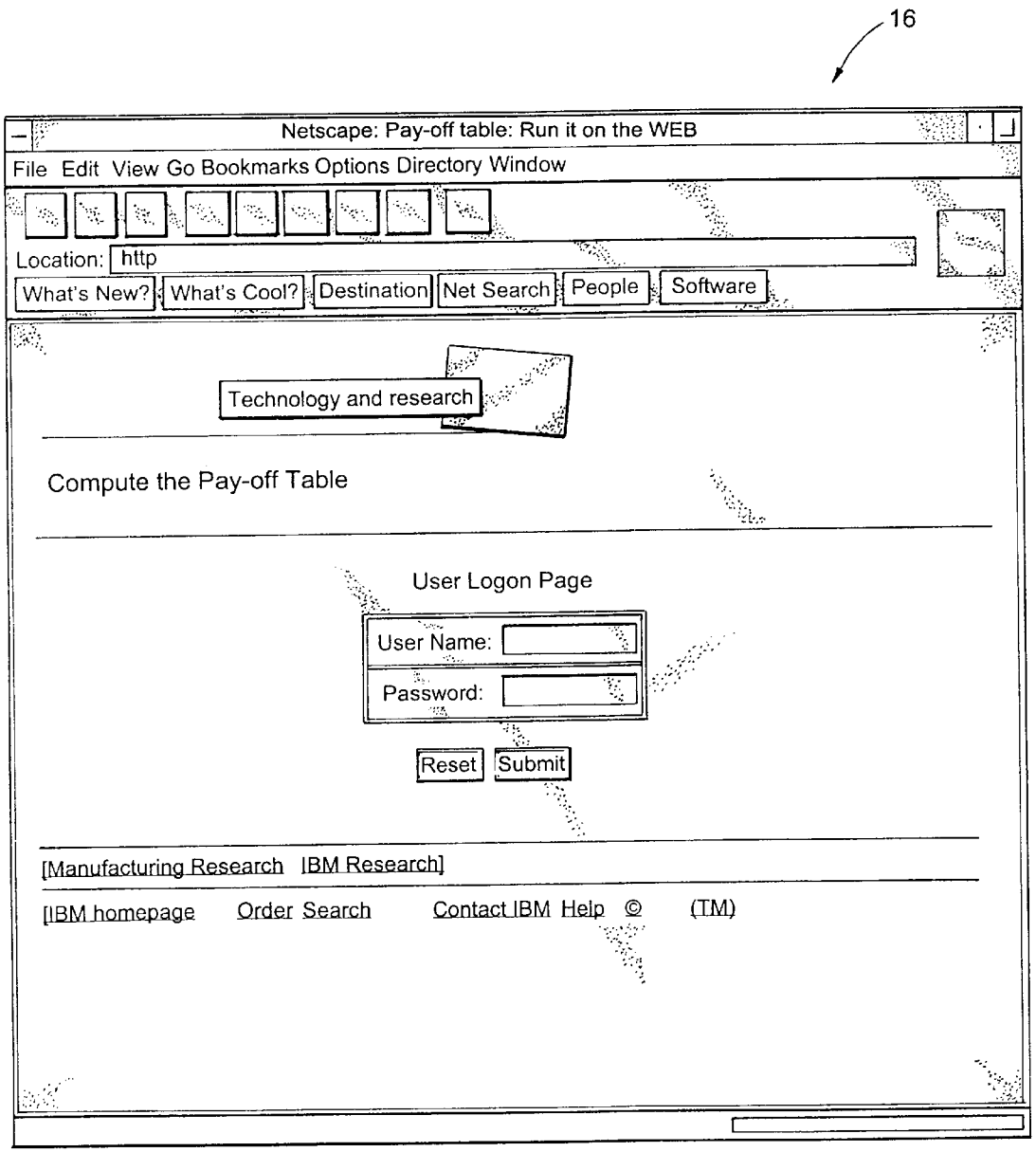
FIGS. 3–8 show illustrative output computer display windows generated in accordance with the present invention.

The Logon Page (see FIG. 3)

The user is required to enter a valid pair of userid and password. If the userid and the password entered are not valid, further access to other PPPT WWW pages will be denied. Otherwise, the Web browser will connect to the PPPT Main Page.

Figure 4:
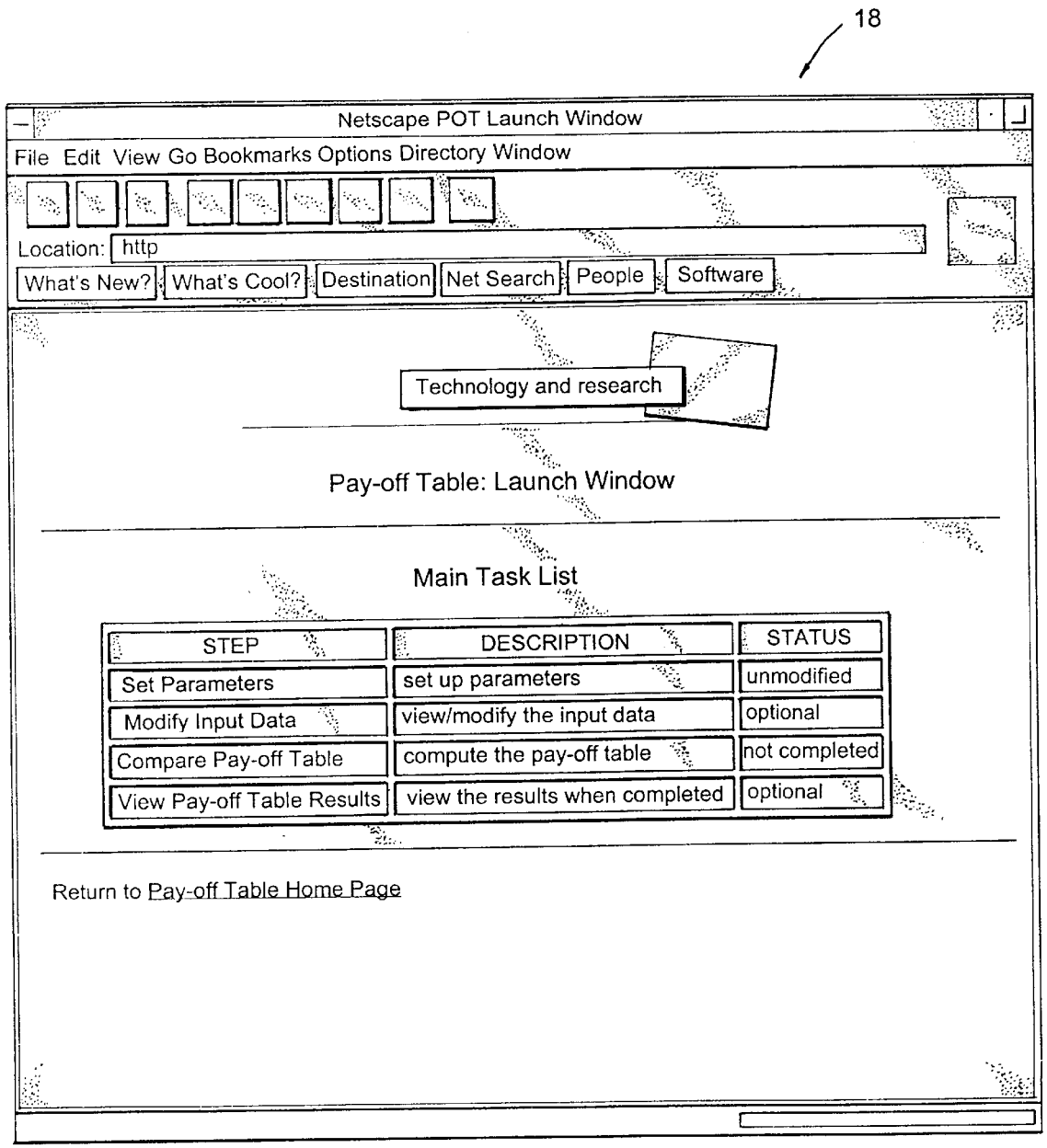
Figure 5:
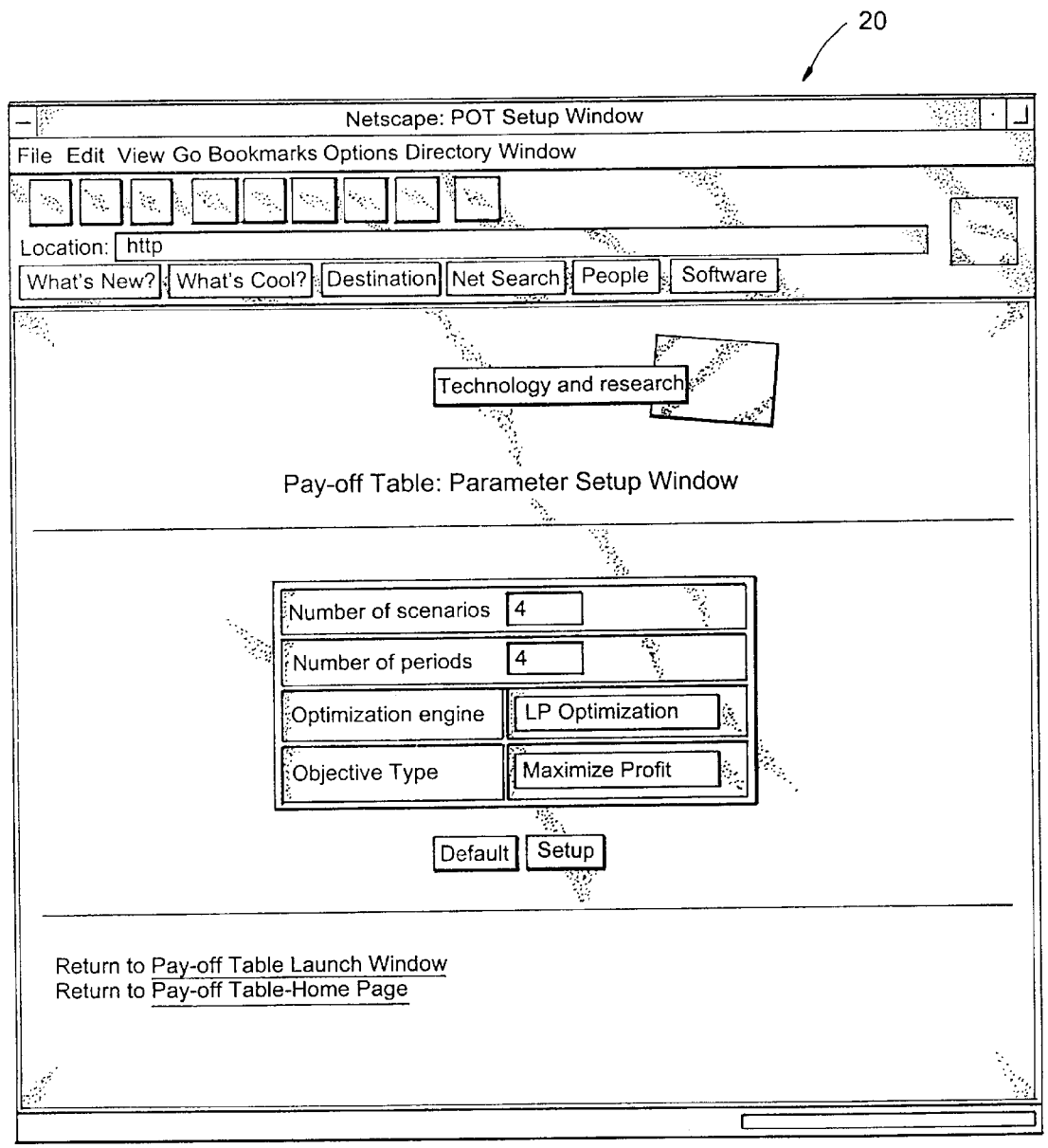
Figure 6:
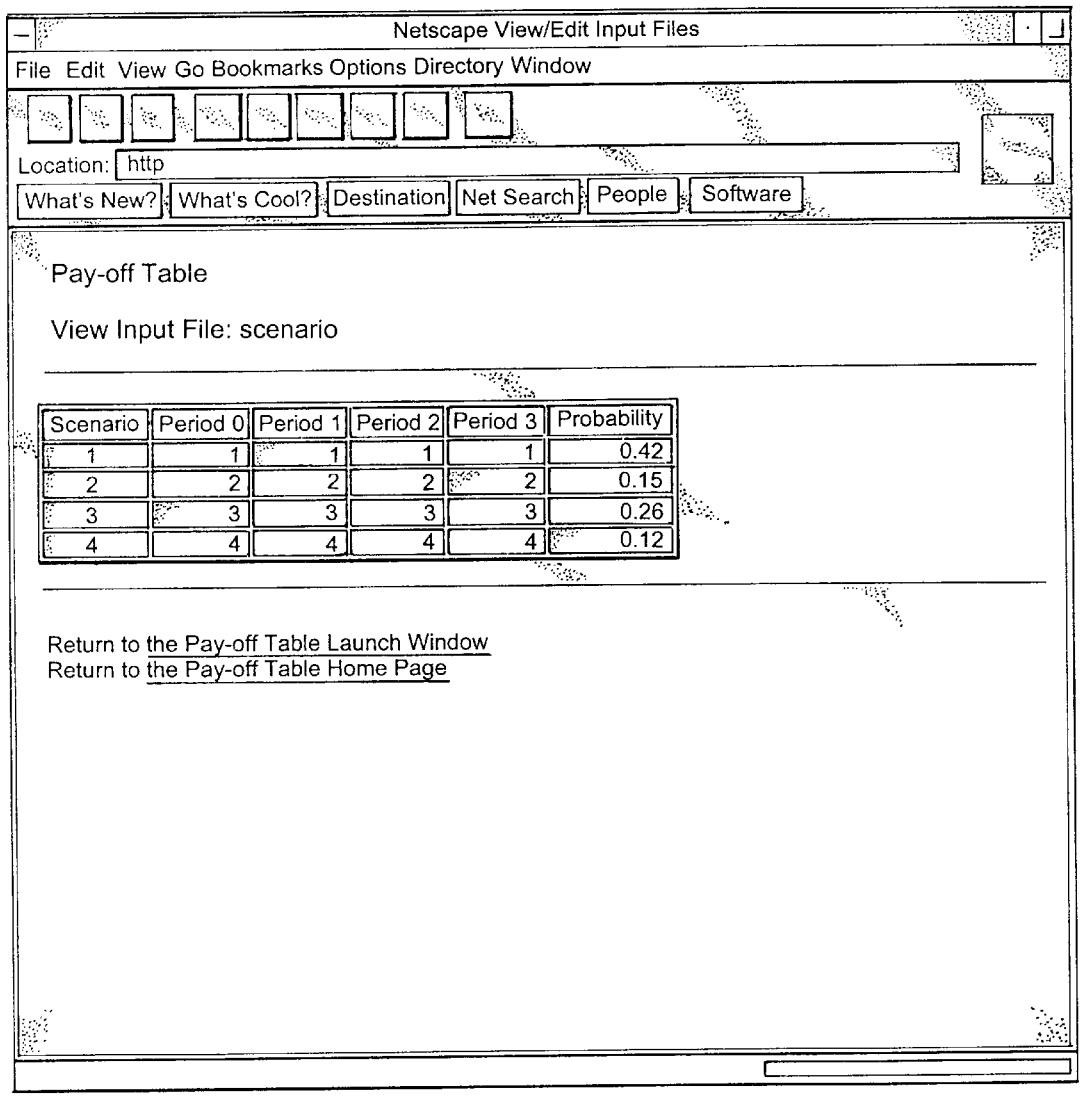
Figure 7:
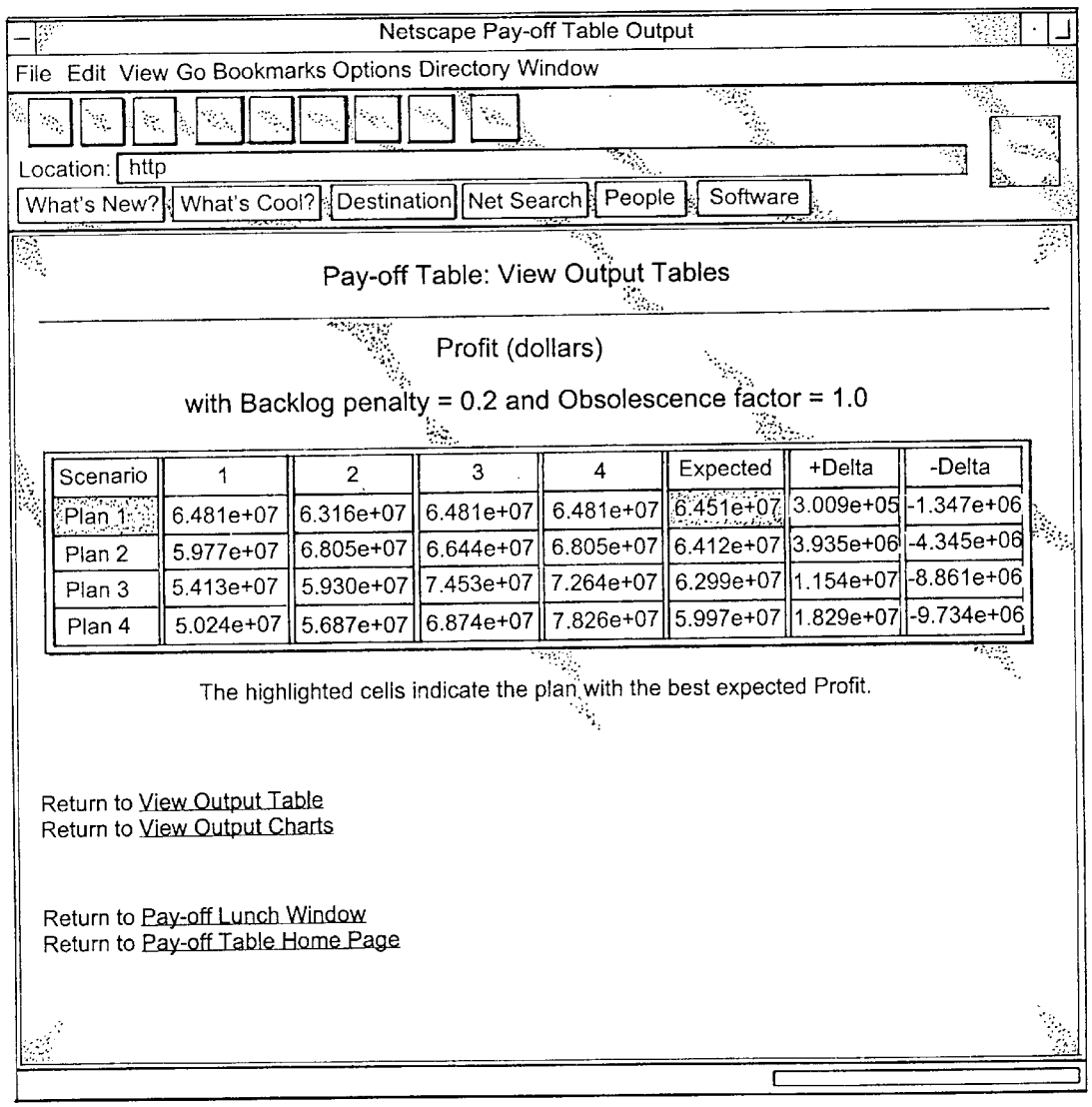
Figure 8:
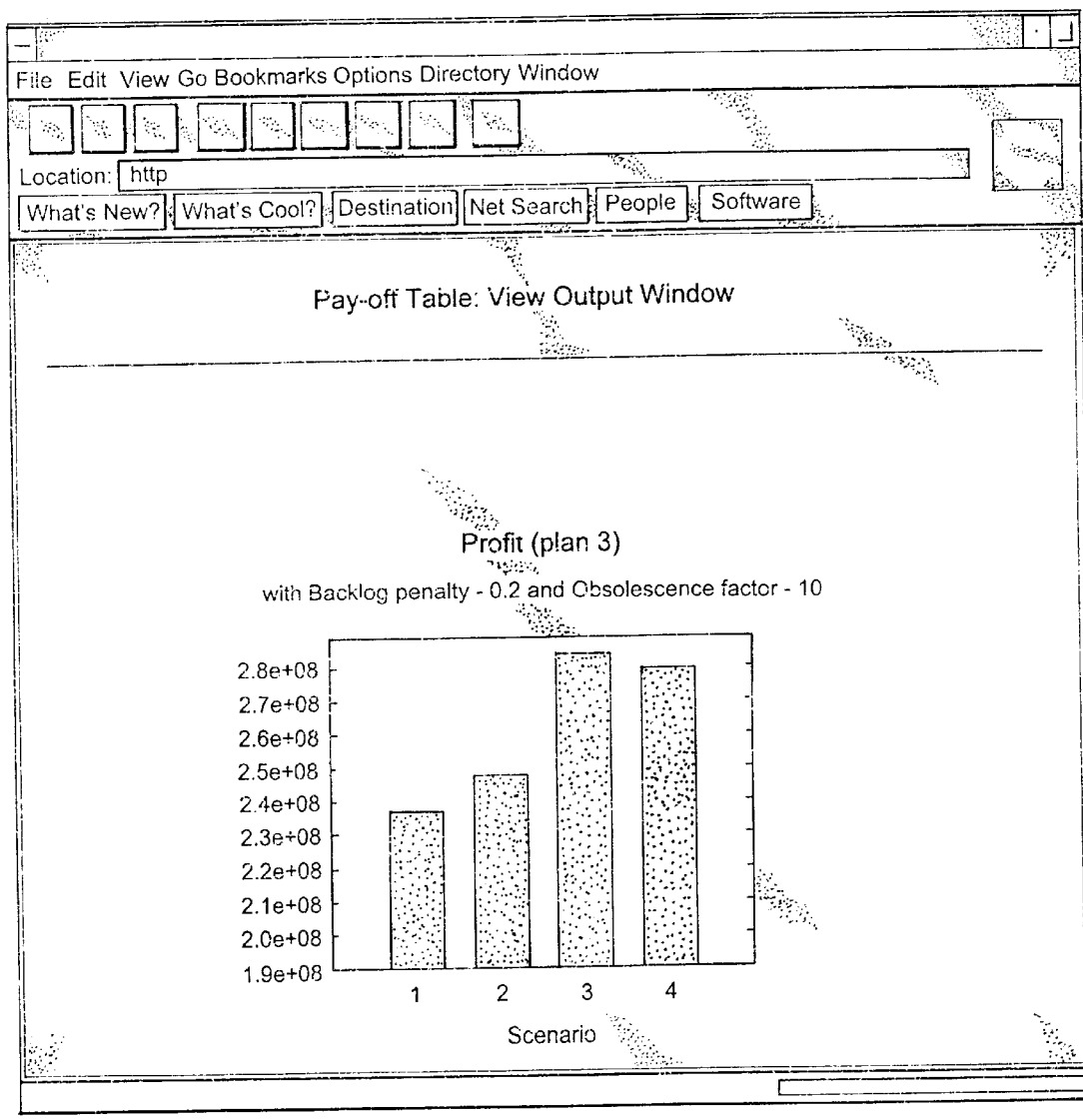

The Main Page (see FIG. 4)

A Main Task List table will be presented. The four major steps of the PPPT computation are listed with a brief description for each step. The current status of each of the four steps is also reported in the table. The user should choose an activity from the Main Task List.

set parameters (see FIG. 5): this step allows the user to view/change the current setting of the following parameters: the number of demand scenarios, the number of periods in the planning horizon, the type of optimization engine to be used, and the type of objective for optimization.

modify data: allows the user to view/modify the data used for the PPPT computation. There are four types of data files to be viewed/modified:

Scenario File,
Bill of Materials File,
Supply Volume File, and
Demand Volume Files The user can choose one of the files for viewing/editing.

compute payoff table: invokes the server programs to perform the desired PPPT computation.

Upon the completion of the PPPT computation, the message "Pay-off Table computation is completed!" will be displayed.

view payoff table: allows the user to view the payoff table in either table format or chart format.

Data Viewing/Editing Pages

For the Bill of Materials file, no editing capability is provided. For Scenario, Supply Volume, and Demand Volume files, the user can view and edit the data if desired (see FIG. 6). A complete table will be presented first for viewing. If editing is allowed, the user can click on the line number to enter the editing mode. Only one row will be displayed at a time in the editing mode.

PPPT Display Pages

If the table format is selected, a user may choose one performance measure to be displayed from the following three choices: Revenue, Profit, and Serviceability. If Profit is selected, the user may also provide the backlog penalty factor and the obsolescence factor as required for the profit computation. The payoff table displayed in the table form contains the complete payoff table of the selected performance measure and the weighted average performance measure for each plan as well as the differences between the weighted average and the best(worst) performance measure of the plan against a particular scenario. The plan with the best weighted average performance measure will be highlighted in the table (see FIG. 7).

In the bar chart format, a user may choose to display a bar chart that is corresponding to a row or a column in the payoff table, i.e., the performance measures of a given plan against different scenarios or the performance measures of different plans for a given scenario. The performance measure displayed in the bar chart form can be either Revenue or Profit or Serviceability. The backlog penalty factor and the obsolescence factor are required as inputs when Profit is selected (see FIG. 8).

5. An Example

The invention is now referenced by an illustrative example. For machine realization of the invention, one may consider the example parameters in the following Tables II–X to be inputs for operation thereupon by the method programmed in Perl and effectuated by a CPU and memory, and Table XI or FIGS. 7, 8 to be illustrative output displays.

Description

This is a two-period problem with six products and four demand scenarios.

Data preparation

The data required for the PPPT computation are listed in Tables 2–10.

TABLE 2

Demand Volume File 1

| Part Number | Geography | Period 1 | Period 2 |
|---|---|---|---|
| SUP-DT | WW | 1,865 | 1,892 |
| MC-DT | WW | 12,450 | 15,040 |
| SUP-NB | WW | 10,300 | 8,930 |
| MC-NB | WW | 6,700 | 8,500 |
| SUP-SVR | WW | 7,540 | 7,990 |
| MC-SVR | WW | 5,200 | 6,400 |

TABLE 3

Demand Volume File 2

| Part Number | Geography | Period 1 | Period 2 |
|---|---|---|---|
| SUP-DT | WW | 17,718 | 17,974 |
| MC-DT | WW | 11,828 | 14,288 |
| SUP-NB | WW | 12,360 | 10,716 |
| MC-NB | WW | 8,040 | 10,200 |
| SUP-SVR | WW | 7,540 | 7,990 |
| MC-SVR | WW | 5,200 | 6,400 |

TABLE 4

Demand Volume File 3

| Part Number | Geography | Period 1 | Period 2 |
|---|---|---|---|
| SUP-DT | WW | 21,448 | 21,758 |
| MC-DT | WW | 14,318 | 17,296 |
| SUP-NB | WW | 11,845 | 10,270 |
| MC-NB | WW | 7,705 | 9,775 |
| SUP-SVR | WW | 8,671 | 9,189 |
| MC-SVR | WW | 5,980 | 7,360 |

TABLE 5

Demand Volume File 4

| Part Number | Geography | Period 1 | Period 2 |
|---|---|---|---|
| SUP-DT | WW | 20,375 | 2,067 |
| MC-DT | WW | 13,602 | 16,431 |
| SUP-NB | WW | 14,214 | 12,323 |
| MC-NB | WW | 9,246 | 11,730 |

TABLE 5-continued

Demand Volume File 4

| Part Number | Geography | Period 1 | Period 2 |
|---|---|---|---|
| SUP-SVR | WW | 8,671 | 9,189 |
| MC-SVR | WW | 5,980 | 7,360 |

TABLE 6

Supply Volume File

| Part Number | Geography | Period 1 | Period 2 |
|---|---|---|---|
| MEM-4MB | WW | 250,000 | 250,000 |

TABLE 7

Bill of Materials File

| Parent Part Number | Child Part Number | Geography | Usage Rate |
|---|---|---|---|
| SUP-DT | P-486 | WW | 1 |
| SUP-DT | HD-240 | WW | 1 |
| SUP-DT | MEM-4MB | WW | 1 |
| MC-DT | P-486 | WW | 1 |
| MC-DT | HD-480 | WW | 1 |
| MC-DT | MEM-4MB | WW | 1 |
| SUP-NB | P-PENTIUM | WW | 1 |
| SUP-NB | HD-480 | WW | 1 |
| SUP-NB | MEM-4MB | WW | 2 |
| SUP-NB | CD-ROM | WW | 1 |
| MC-NB | P-PENTIUM | WW | 1 |
| MC-NB | HD-720 | WW | 1 |
| MC-NB | MEM-4MB | WW | 2 |
| MC-NB | CD-ROM | WW | 1 |
| SUP-SVR | P-POWERPC | WW | 1 |
| SUP-SVR | HD-720 | WW | 1 |
| SUP-SVR | MEM-4MB | WW | 4 |
| SUP-SVR | CD-ROM | WW | 1 |
| SUP-SVR | TOK-RING | WW | 1 |
| MC-SVR | P-POWERPC | WW | 1 |
| MC-SVR | HD-720 | WW | 1 |
| MC-SVR | MEM-4MB | WW | 4 |
| MC-SVR | CD-ROM | WW | 1 |
| MC-SVR | MULT-MED | WW | 1 |

TABLE 8

Scenario File

| Scenario | Period 1 | Period 2 | Probability |
|---|---|---|---|
| 1 | 1 | 1 | 0.42 |
| 2 | 2 | 2 | 0.18 |
| 3 | 3 | 3 | 0.28 |
| 4 | 4 | 4 | 0.12 |

TABLE 9

Revenue File

| Part Number | Geography | Revenue |
|---|---|---|
| SUP-DT | WW | 1,000 |
| MC-DT | WW | 1,100 |
| SUP-NB | WW | 2,000 |
| MC-NB | WW | 2,400 |

TABLE 9-continued

Revenue File

| Part Number | Geography | Revenue |
|---|---|---|
| SUP-SVR | WW | 3,500 |
| MC-SVR | WW | 4,000 |

TABLE 10

Profit File

| Part Number | Geography | Profit |
|---|---|---|
| SUP-DT | WW | 250 |
| MC-DT | WW | 250 |
| SUP-NB | WW | 500 |
| MC-NB | WW | 700 |
| SUP-SVR | WW | 600 |
| MC-SVR | WW | 1,100 |

Procedure

1. Start a Web Browser and link to the URL of the PPPT Web server.
2. When prompted, enter the userid and password.
3. On the Main Task List page, select "set parameters".
4. On the Set Parameters page, enter "4" for the number of scenarios, "2" for the number of periods, select "LP Optimization" for the optimization engine, and "Profit" for the objective type. Then click the "Submit" button.
5. Go back to the Main Task List page. Select "modify data".
6. Modify the data by following appropriate links as desired.
7. Go back to the Main Task List page. Select "compute payoff table".
8. Wait until a screen with the message "The Payoff Table computation is completed".
9. Go to the View Payoff Table Results page, select "view output tables" to view the payoff table in table format, or select "view output charts" to view the payoff table in bar-chart format.
10. On the View Output Tables page, select one from "Profit", "Revenue", and "Serviceability". If "profit" is selected, enter the values for "Backlog penalty" and "Obsolescence factor". Then click on "Submit" to view the output.
11. On the View Output charts page, select either "Plan" or "Scenario" and the number, also select one from "Profit", "Revenue", and "Serviceability". If "profit" is selected, enter the values for "Backlog penalty" and "Obsolescence factor". Then click on "Submit" to view the output.
12. Repeat any step(s) as desired.

Outputs

The results of this example are summarized in Table 11. The revenue and profit figures are in million dollars.

TABLE 11

| | | PPPT Results | | | | | | |
|---|---|---|---|---|---|---|---|---|
| j | scenario | 1 | 2 | 3 | 4 | Statistics | | |
| $\rho_j$ | probability | 0.42 | 0.18 | 0.28 | 0.12 | Mean | $\Delta+$ | $\Delta-$ |
| $P^1$ | revenue | 243.5 | 240.1 | 243.5 | 243.5 | 242.9 | 1.4 | −2.8 |
| | profit | 41.57 | 35.77 | 30.77 | 26.79 | 35.73 | 5.84 | −8.94 |
| $P^2$ | revenue | 240.3 | 255.1 | 251.5 | 255.1 | 247.8 | 7.3 | −7.5 |
| | profit | 35.87 | 43.66 | 33.99 | 32.35 | 36.32 | 7.34 | −3.97 |
| $P^3$ | revenue | 243.5 | 251.7 | 280 | 276.1 | 259.1 | 20.9 | −16.6 |
| | profit | 30.89 | 34.23 | 47.8 | 41.14 | 37.46 | 10.34 | −6.57 |
| $P^4$ | revenue | 243.5 | 255.1 | 276.3 | 293.4 | 260.8 | 32.6 | −17.3 |
| | profit | 26.99 | 32.48 | 41.26 | 50.21 | 34.76 | 15.45 | −7.77 |

Backlog penalty factor=0.2, obsolescence factor=0.5

In this PPPT, both the revenues and the profits are listed for the comparison purpose. The highest mean in terms of revenues is archived by Plan 4, while the highest mean in terms of profits is archived by Plan 3. Furthermore, if one's objective is to minimize the variability of the performance under different scenarios, the best plan will be the one with the smallest $\Delta+$ and $\Delta-$ (Plan 1 in this example).

We can also obtain the upper and lower bounds of the optimal solution from the table.

Revenue:
$R_U$=261.8 million dollars, $R_L$=260.8 million dollars.

Profit:
$R_U$=44.72 million dollars, $R_L$=37.46 million dollars.

What is claimed:

1. A method for producing planning in an uncertain demand environment, said method comprising the steps of:
   a. providing plurality of demand scenarios having discrete time periods, and a probability for each of said demand scenarios;
   b. representing uncertainty in a demand environment by employing a scenario-based analysis including the steps of performing multiple optimization runs against different demand scenarios; and
   c. generating optimal deterministic solutions for each of said demand scenarios using an implosion technology;
   d. computing expected payoffs for said demand scenarios and choosing an optimal production plan having a best of said expected payoffs; and
   e. modifying manufacturing of said products according to said chosen optimal production plan.

2. The method of claim 1, wherein said generating step comprises the following steps:
   1. generating production plans for each of said demand scenarios having a fixed production decision
   2. generating production plans for each of said demand scenarios having a varied production decision using said production plan generated in step (b) for a first discrete time period and solving for demand scenarios for remaining discrete time periods as indicated in said production decision using an implosion technology.

3. The method of claim 2, wherein said optimal production plan is created based initially on a particular demand scenario.

4. The method of claim 3, wherein said optimal production is adjusted according to unfolding sequel demand scenarios.

5. The method of claim 4, wherein said optimal production is obtained using an implementable production policy for an entire demand scenario tree.

6. The method of claim 5, wherein an expected performance measure is computed for each said implementable production policy based on a particular initial demand scenario.

7. A computer program device readable by a machine, tangibly embodying a program of instructions executable by a machine to perform method steps for production planning in an uncertain demand environment, said method comprising the steps of:

a. providing plurality of demand scenarios having discrete time periods, and a probability for each of said demand scenarios;

b. representing uncertainty in a demand environment by employing a scenario-based analysis including the steps of performing multiple optimization runs against different demand scenarios; and c. generating optimal deterministic solutions for each of said demand scenarios using an implosion technology;

d. computing expected payoffs for said demand scenarios and choosing an optimal production plan having a best of said expected payoffs; and e. modifying manufacturing of said products according to said chosen optimal production plan.

8. The device of claim 7, wherein said generating step comprises the following steps:

1. generating production plans for each of said demand scenarios having a fixed production decision 2. generating production plans for each of said demand scenarios having a varied production decision using said production plan generated in step (b) for a first discrete time period and solving for demand scenarios for remaining discrete time periods as indicated in said production decision using an implosion technology.

9. The device of claim 8, wherein said optimal production plan is created based initially on a particular demand scenario.

10. The device of claim 9, wherein said optimal production is adjusted according to unfolding sequel demand scenarios.

11. The device of claim 10, wherein said optimal production is obtained using an implementable production policy for an entire demand scenario tree.

12. The device of claim 11, wherein an expected performance measure is computed for each said implementable production policy based on a particular initial demand scenario.

* * * * *